(12) United States Patent
Meyers et al.

(10) Patent No.: US 11,905,122 B2
(45) Date of Patent: Feb. 20, 2024

(54) METHOD AND APPARATUS FOR CLEANING AND SANITIZING A CONVEYOR BELT

(71) Applicants: Sheldon Meyers, Brockport, NY (US); Michael Schrlau, Pittsford, NY (US); Chad Uckermark, Rochester, NY (US)

(72) Inventors: Sheldon Meyers, Brockport, NY (US); Michael Schrlau, Pittsford, NY (US); Chad Uckermark, Rochester, NY (US)

( * ) Notice: Subject to any disclaimer, the term of this patent is extended or adjusted under 35 U.S.C. 154(b) by 0 days.

(21) Appl. No.: 18/088,835

(22) Filed: Dec. 27, 2022

(65) Prior Publication Data

US 2023/0133926 A1 May 4, 2023

Related U.S. Application Data

(63) Continuation of application No. 17/322,878, filed on May 17, 2021, now Pat. No. 11,565,887.

(60) Provisional application No. 63/026,717, filed on May 18, 2020.

(51) Int. Cl.
*B65G 45/22* (2006.01)
*B65G 39/073* (2006.01)

(52) U.S. Cl.
CPC .......... *B65G 45/22* (2013.01); *B65G 39/073* (2013.01)

(58) Field of Classification Search
CPC ...... B65G 45/22; B65G 39/073; B65G 45/12; B65G 45/14; B65G 45/16; B65G 45/18; B65G 45/24; A47F 9/02
USPC .................................................. 198/495–498
See application file for complete search history.

(56) References Cited

U.S. PATENT DOCUMENTS

| | | | | |
|---|---|---|---|---|
| 4,960,200 | A * | 10/1990 | Pierce | B65G 45/24 198/502.1 |
| 6,971,503 | B2 * | 12/2005 | Thompson | B65G 45/22 198/496 |
| 7,077,260 | B2 * | 7/2006 | Saballus | B65G 45/22 134/122 R |
| 8,978,875 | B2 * | 3/2015 | Barboni | B65G 45/22 198/497 |
| 9,096,392 | B1 * | 8/2015 | Barragan | B65G 45/22 |
| 9,248,975 | B2 * | 2/2016 | Handy | B65G 45/26 |
| 10,046,920 | B1 * | 8/2018 | Green | B08B 3/041 |
| 10,266,348 | B1 * | 4/2019 | Yoo | B65G 45/18 |

\* cited by examiner

*Primary Examiner* — Mark A Deuble
(74) *Attorney, Agent, or Firm* — Andrew Morabito

(57) ABSTRACT

The present invention is a conveyor belt cleaning apparatus, comprising: a case, wherein the case is designed to secure to a conveyor belt assembly; a frame member, wherein the frame member is secured to the case; at least one applicator attached to the frame member; tubing attached to the frame member and directly in contact with the applicator; at least one pump connected to the tubing; a solution reservoir connected to the at least one pump.

16 Claims, 5 Drawing Sheets

METHOD AND APPARATUS FOR CLEANING AND SANITIZING A CONVEYOR BELT

CROSS-REFERENCE TO RELATED APPLICATIONS

This application is a continuation-in-part (and claims the benefit of priority under 35 USC 120) of U.S. application Ser. No. 17/322,878 filed May 17, 2021. The disclosure of the prior applications is considered part of (and is incorporated by reference in) the disclosure of this application.

BACKGROUND OF THE INVENTION

The present invention relates to conveyor belts, and more particularly to a sanitizing attachment for conveyor belts.

It has been recognized in the industry and by the public in general that conveyor belts used in store checkouts (e.g., grocery stores, home good stores, etc.) can be a source of contamination of foods or other purchased items, due to the large number items that are in physical contact with the conveyor belt. For example, food products, cleaners, medicines, chemical products (e.g., glues, adhesives, polishes, etc.) may come in contact with the conveyor belt surfaces. Additionally, individuals may touch, sneeze, or drool on the belt, which may lead to direct exposure to various diseases. However, the conveyor belt is not easily removed, and cleaning may not be performed on a regular basis. Accordingly, this can lead to both real and perceived dangers of contamination from the conveyor belt. Now more than ever it is vital to keep these surfaces clean to help prevent the spread of disease or viruses.

One of the many challenges for check-out cashiers who operate conveyor belts is the maintenance of the belt. The cashier must ensure that the conveyor belt is kept clean, and that their customers have a clean place to set their groceries. Grocery stores carry a wide variety of products, including fresh and frozen vegetables, containers of milk and ice cream, fresh fish, poultry, and beef, along with household cleaning solutions and chemicals, such as soaps and bleach. Despite significant improvements in product packaging, it is a fact that many products still leak fluids. Loose wrapping may allow leaks on the belt, such as the juices from raw meats. Or plastic bottles with a loose lid, may leave sticky fluids on the conveyor belt. Since the fluids and debris left on the conveyor belt may be from uncooked meat, poultry, fish, or perhaps a leaky bleach or medicine bottle, bacteria and/or toxins can leave behind contamination. It is known that people coming in contact with bad forms of bacteria and/or toxins can such as those that can be found on conveyor belts can become sick from any number of foodborne or other viral diseases, Therefore, unsanitized belts can lead to significant health and safety concerns to both to shoppers and store employees.

Due to these concerns, it is routine for a cashier to have a bottle of cleaner and/or disinfectant at their station. Armed with a roll of paper towels, or some form of cloth wiper it is a typical practice for cashiers to periodically spray any particular type of cleaner which may or may not include sanitizers/disinfectants onto their conveyor belt in order to wipe away dirt, a smudge, smear or collection of unknown substances. Unfortunately, when there is a long line of anxious customers, or there are no more towels or disinfectant solution available to the cashier, it is possible that the conveyor belt is not cleaned often enough. In addition, the thoroughness of the cleaning/sanitizing is only as good as the training and quality of work performed by the employee. This can be particularly troubling when considering the types of fluids that may exist on the surface of the conveyor belt as mentioned above and which can include uncooked food drippings laced with bacteria such as *Escherichia coli* (*E-coli*), *Salmonella*, and other assorted viral bacteria and fungi.

Although some automatic cleaning systems for conveyor belts have been attempted, these existing systems often involve an internal sprayer that dispenses directly on the belt from underneath. However, if the spray from underneath begins operating while a customer is actively loading the belt with products that they intend to purchase, that section will not have been effectively sanitized. This same ineffectiveness can happen if the employee/cashier starts spraying cleaner/sanitizer after the products to be purchased had already been placed onto the belt. In both instances, when the conveyor belt is actively in use, the initial spray is performed in front of where products are being placed.

These internal solutions for cleaning and sanitizing conveyor belts are complicated, costly, and difficult to maintain. Accordingly, it would be beneficial to have a cleaning system that can be added to both new and existing conveyor belt systems with easy and quick installation, low maintenance requirements, and simple to operate.

It is desired to have an attachment to the conveyor belt that is easy to install, provides an efficient and effective sanitizing of the conveyor belt, and provides customers with the reassurance that the conveyor belt is sanitized. In effect, adding an additional and more complete layer of protection against foodborne and viral illness.

SUMMARY

In a first embodiment, the present invention is a conveyor belt cleaning apparatus, comprising: a case, wherein the case is designed to secure to a conveyor belt assembly; a frame member, wherein the frame member is secured to the case; at least one applicator attached to the frame member; tubing attached to the frame member and directly in contact with the applicator; at least one pump connected to the tubing; a solution reservoir connected to the at least one pump.

In a second embodiment, the present invention is a conveyor belt cleaning apparatus, comprising: a frame member secure to a conveyor belt assembly; a solution application assembly, wherein the solution application assembly comprises a pump, tubing, and a solution reservoir a motor, microchip control board (or operating control device); and at least one applicator attached to the frame member and in direct contact with the tubing.

In a third embodiment, the present invention is a conveyor belt cleaning apparatus, comprising: a solution reservoir; a pump connected to the solution reservoir; tubing connected to the pump; a frame in communication with the conveyor belt; an applicator attached to the frame and wherein the applicator is in communication with the tubing; and a control system connected to the frame and the pump.

DETAILED DESCRIPTION OF THE INVENTION

Figure 1:
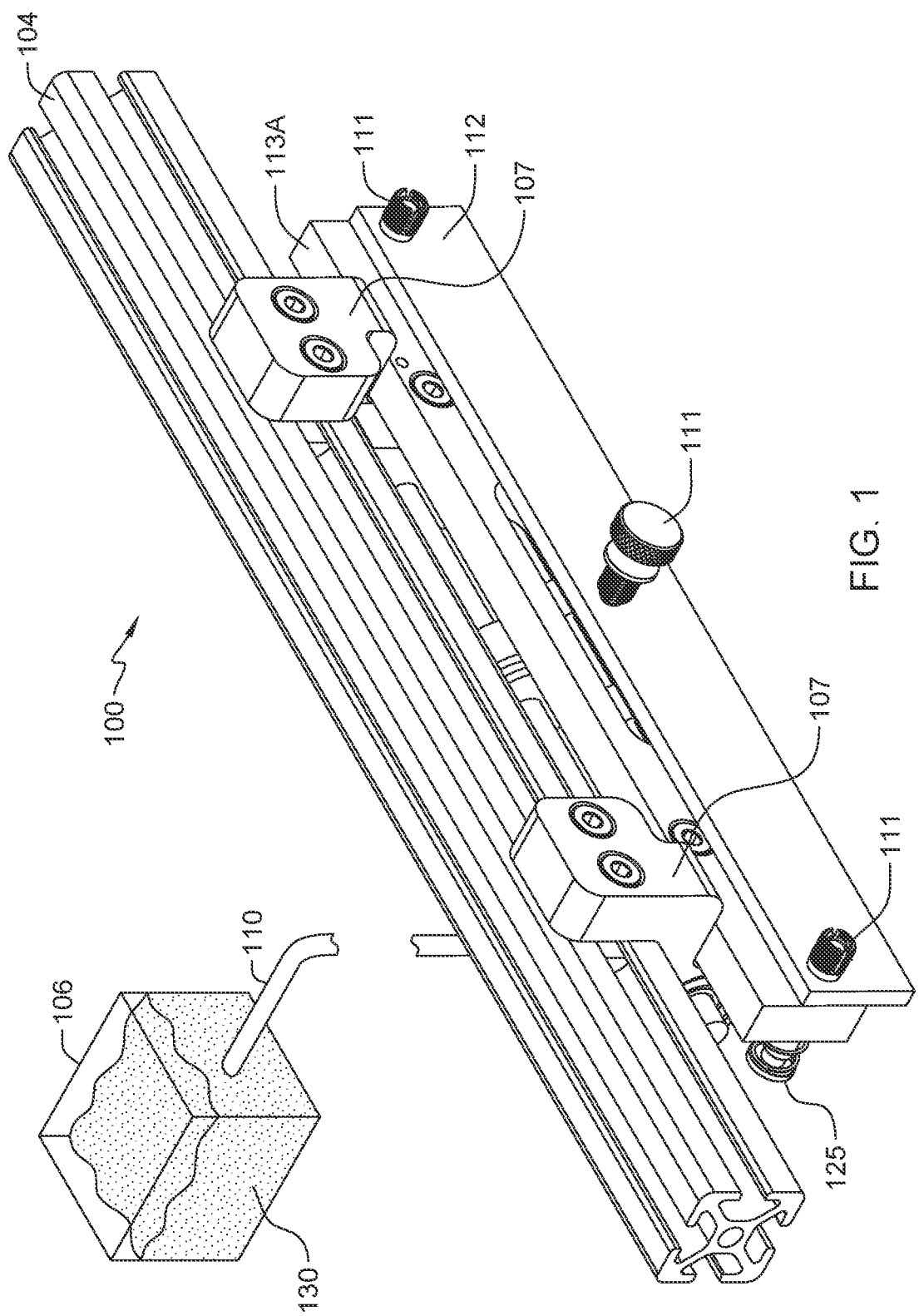
FIG. 1 depicts an isometric view of a conveyor belt sanitizing apparatus in an in-use position, in accordance with one embodiment of the present invention.

The present invention provides a device which is able to both clean and sanitize conveyor belt. The device is designed to be attached to a variety of different conveyor belts configurations, thereby creating a versatile device which is not limited to a single type of conveyor belt. The device is secured to the conveyor belt and is able to apply a cleaning solution directly on the conveyor belt to assist in providing a clean and sanitized surface for a person to place their groceries or for other applications where a sterile conveyor belt is preferred. The section of the conveyor belt which is cleaned is that in which the customer would be directly placing their items on. After the applied solution self-dries/evaporates within a short period of time. Recommended operation of the device is when customers are not actively using the conveyor but in between cashier shifts or at regularly scheduled times. This is advantageous over the prior art due to its straightforward design, ease of installation, versatility, simplicity of operation, and efficiency in cleaning/sanitizing the conveyor belt surface.

The prior art is either complex systems which are built into the actual conveyor belt, meaning the systems are expensive and isolated to a single conveyor belt. Furthermore, prior art uses spray nozzles that applies the solution to the conveyor belt, which can lead to excess solution being used and creating waste and added expense They also can require tremendous amounts of work to repair and maintain. The alternative to this is to have a person spray a cleaner or sanitizing agent onto the conveyor belt. This has two flaws, first it requires unnecessary manpower and leaves chances where the person is missing sections of the conveyor belt. In this instance the quality and coverage of the cleaner/sanitizer is only as good as the training and quality of the employees' work. Second, the person is usually spraying the material at the end of the belt which is returned to the interior of the machine, and the section in which the customer is placing their groceries was not cleaned or sanitized, defeating the purpose of the person spraying the disinfectant.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 2:
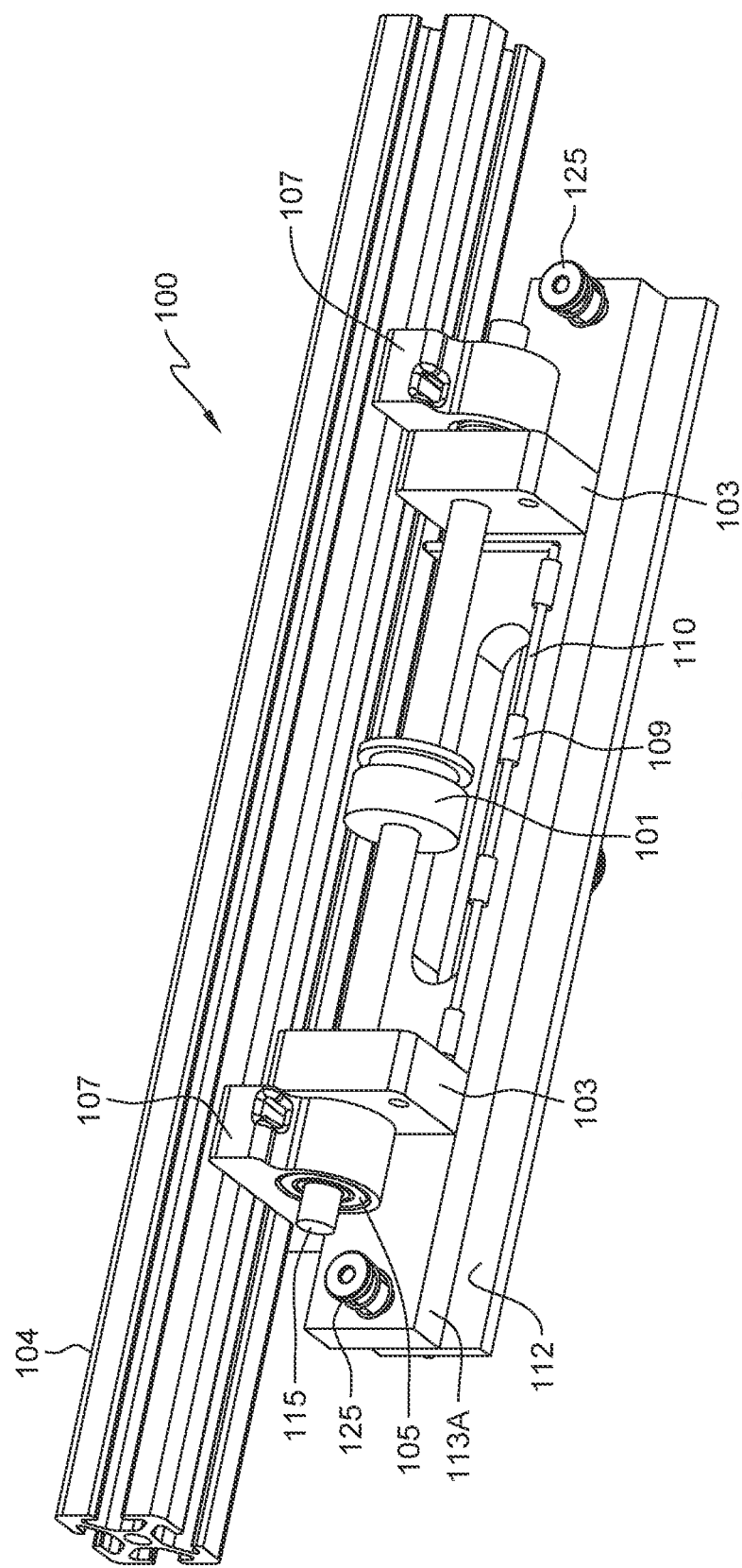
FIG. 2 depicts another isometric view of the conveyor belt sanitizing apparatus, in accordance with one embodiment of the present invention.
Figure 3:
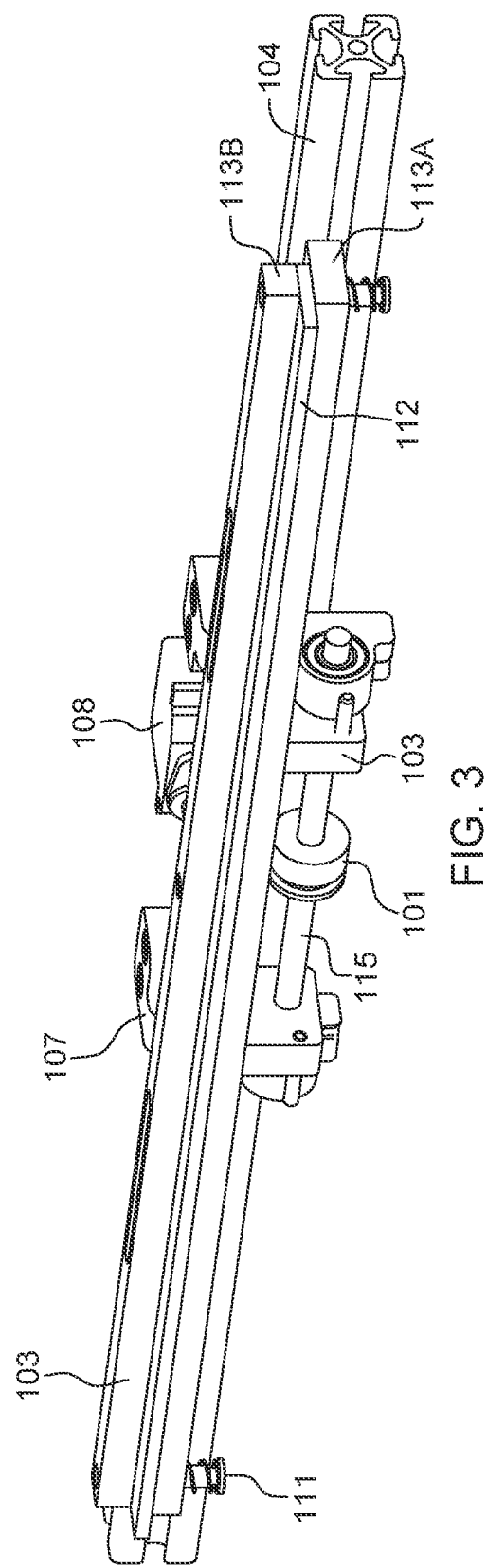
FIG. 3 depicts an isometric view of the conveyor belt sanitizing apparatus in a stored position, in accordance with one embodiment of the present invention.

FIGS. 1-3 depicts various view and illustrations of a conveyor belt sanitizing apparatus 100, in accordance with one embodiment of the present invention.

A frame member 104 provides the structure in which a pump 108, tubing 110, applicator 112 are attached to. The frame member 104 is used to secure the conveyor belt sanitizing apparatus 100 to the conveyor belt and provide the structure and mounting for the conveyor belt sanitizing apparatus 100. In the depicted embodiment, the frame member 104 is a section of extruded material with grooves to mount the various components too. The frame member 104 may have a variety of shapes and designs based on the conveyor belt design and the components of the apparatus 100. In some embodiments, the motor 101, a computing device (not shown), solution container 106, a pump 108 may also be secured to the frame member 104. In additional embodiments, the pump 108, computing device, control buttons (not shown), and the solution container 106 are located distal from the frame 104 (and the apparatus 100) and near to the operator (cashier/employee). In some embodiments, the frame member 104 is secured to the case 102, and the case 102 is secured to the conveyor belt.

The applicator support 113A is secured to the frame member 104 and is used to provide support for the applicator (s) 112 and the tubing 110. The mounting system 107 is comprised of the frame mounts 107 which are attached to the frame member 104 using fasteners or the like. The frame mounts 107 are able to pivot or rotate about to move the applicator 112 towards and away from the conveyor belt. In the depicted embodiment, the frame mounts 107 has bearings 105 which are secured to the frame mounts 107. A rod 115 passes through these bearings 105 and is able to rotate. Secured to the rod 115 is a motor 101 which assists in the rotation of the rod 115. In the depicted embodiment, the motor 101 is shown attached to the rod 115 in a specific fashion. The motor 101 may be positioned or connected to the rod in a variety of setups based on the overall design of the apparatus 100 and is not intended to be a limitation to the overall design of the apparatus 100. Applicator mounts 103 are secured to the rod 115 and also secured to an applicator support 113A. The applicator 112 is secured to the applicator support 113A through fasteners 111, or other means to secure the applicator 112 to the applicator support 113A. In the depicted embodiment in FIG. 3, an applicator support 113B is used secure the applicator 112 in another design, and the fasteners 111 have springs 125 which assist in keeping a firm fit of the applicator 112 to the support(s) 113A and 113B. As shown in FIGS. 1-3, the applicator 112 is able to move from a first position or an "off" position (shown in FIG. 3) where the applicator 112 is not in use, to a second position or an "on" position (FIG. 2) where the applicator would be in use. This articulation of the applicator 112 is performed by the motor 101 (e.g. actuating device) being activated and electronically and/or mechanically moving the applicator 112. The movement of the applicator support 113A may be controlled by the motor 101 or device to control the movement of the applicator support 113A. In additional embodiments, a computing device may be incorporated into the apparatus to provide the activation of the pump 108, the movement of the applicator support 113A and the like. The computing device may also be connected to a set of controlled which the operator has access to, to turn on and off the apparatus 100. The computing device may also be able to identify when the solution container 106 is empty or near empty.

A pump 108 is connected to a solution container 106 to draw solution 130 from the solution container 106 and expel the solution 130 through the tubing 110 onto the applicator 112 directly, or the tubing 110 may be inserted into or integrated with applicator 112 to directly inject the solution 130 into the applicator 112 so that the applicator 112 evenly distribute the solution 130 across the entire surface of the conveyor belt. The pump 108 may be integrated into the solution container 106 or may be integrated into the conveyor belt sanitizing apparatus (as shown in FIG. 3). The pump 108 is able to provide adequate solution 130 flow rate and volume. In the depicted embodiment, the tubing 110 interfaces with the applicator support 113A and apertures which the tubing 110 interfaces with, within the applicator support 113A allow the passage of the solution 130 directly into the applicator 112. The tubing 110 is screwed into the applicator support 113A to create a liquid tight seal, and the apertures within the applicator support 113A allow for the passage of the solution 130 directly onto the applicator 112. The tubing 110 may have fitment pieces 109 which interface with the applicator support 113A to create a liquid tight seal between the tubing 110 and the applicator support 113A. The fitment pieces 109 interface with the tubing and the applicator support 113A. The fitment pieces 109 may be made from plastic or metal. In additional embodiments, the tubing 110 may directly interface with the applicator 112 based on the applicator support 113A design and structure. In the depicted embodiment, the tubing 110 interfaces with the applicator support 113A on a rear surface but may interface with the applicator support 113A or the applicator 112 on a front, top, or bottom surface based on the overall design of the conveyor belt sanitizing apparatus 100. The applicator support 113A has a predetermined number of apertures based on the applicator 112 type and the conveyor belt type to provide adequate solution 130 flow to achieve the desired result of substantially complete coverage of the conveyor belt with the solution 130.

The tubing 110 distribute the solution 130 from the solution container 106, via the pump 108 and applies the solution either directly onto the applicator 112 or indirectly onto the applicator 112 via the applicator support 113A. The tubing 110 is connected to the pump 108, The tubing 110 is of a predetermined size to allow for a flow rate and volume of the solution 130 based on the applicator 112 design and type and the conveyor belt design and type. In additional embodiments, there may be more than one pump 108 connected to the plurality of tubing 110. The tubing 110 provides all the mechanical components needed to apply the solution onto the applicator 112 or inject the solution 130 into the applicator 112, so that the applicator 112 can properly distribute the solution 130. The tubing 110 may be in contact with the applicator 112 in more than one location based on the size of the applicator 112.

The applicator 112 is designed to spread, apply, or brush the solution 130 onto the conveyor belt so that the solution 130 comes in contact with substantially the entire surface of the conveyor belt. The applicator 112 is sized to provide complete coverage of the conveyor belt so as to provide a substantial coverage of the conveyor belt with the solution 130. This may be accomplished by having multiple applicators 112 Based on the versatility of the present invention and the design, the applicator 112 may be removed and replaced with various sized (width, height, and depth) based on the conveyor belt size. This is easily accomplished by removing the fasteners 111 and installing a new applicator 112. The applicator 112 may be constructed from a variety of materials based on the intended design, the type of pumps used, the shape, or the like. In some embodiments, the applicator 112 may be a roller or have a wand like design. In one embodiment, the applicator 112 is made from a non-porous material such as rubber. The rubber material provides a semi-firm surface to spread the solution 130 on the belt. In other embodiments, the applicator 112 is a porous material, such as, but not limited to, a squeegee, foam, felt, weather stripping, brush, or the like. In these embodiments, where the applicator 112 is porous, the solution 130 may be applied or pumped directly onto the applicator 112 through the tubing 110 or into the applicator 112. The shape and size of the applicator 112 again is based on the application process of the solution 130, the solution consistency, and the conveyor belt design. The applicator 112, may have various profiles, shapes, curvatures, and designs based on the intended application of the solution 130. In some embodiments, multiple applicators 112 are integrated into the design. In the present embodiment, the applicator 112 is a rectangular piece of material which is in a stationary position.

A solution container 106 provides the reservoir for the solution 130. The solution container 106 may be integrated into the case 102 or may be connected to the pump 108 via tubing 110. This allows the solution container 106 to be located distal from the conveyor belt and near the person operating the conveyor belt for easy refilling or replacement of the solution container 106. In some instances the solution container 106 is an assembly with a solution reservoir which is replaceable and a solution reservoir receiving unit to allow for easy replacement when a solution reservoir is employ. In some embodiments, the pump 108 is integrated into the solution container 106. It is advantageous to have the ability to have the pump 108, solution container 106, computing device, and other components located distal to the case 102, to create a design of the case 102 that is slim and does not cover a large area of the conveyor belt. In some embodiments, the case 102 is 2-3 inches wide.

Figure 4:
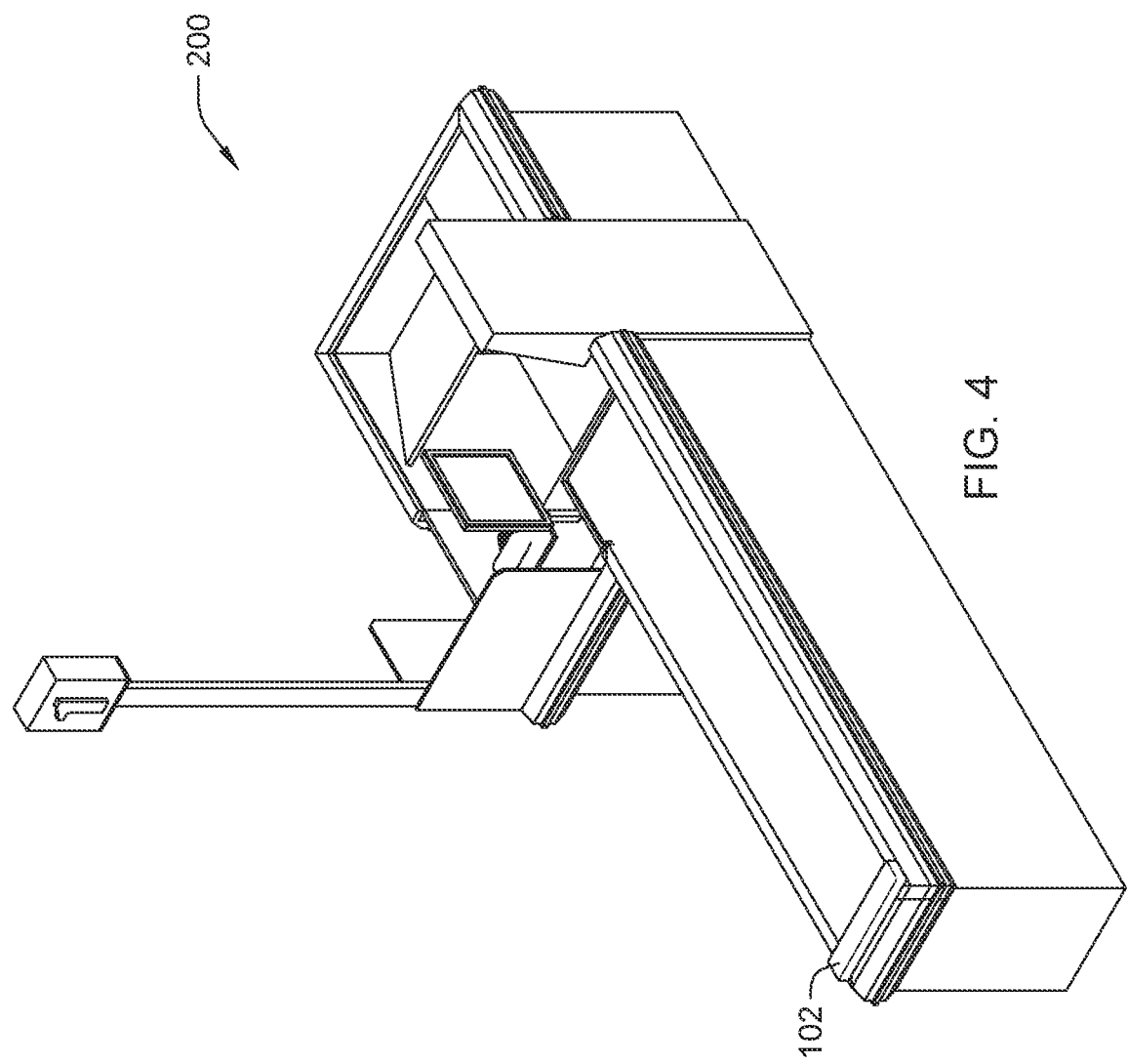
FIG. 4 depicts an isometric view of the conveyor belt sanitizing apparatus installed on a conveyor belt, in accordance with one embodiment of the present invention.
Figure 5:
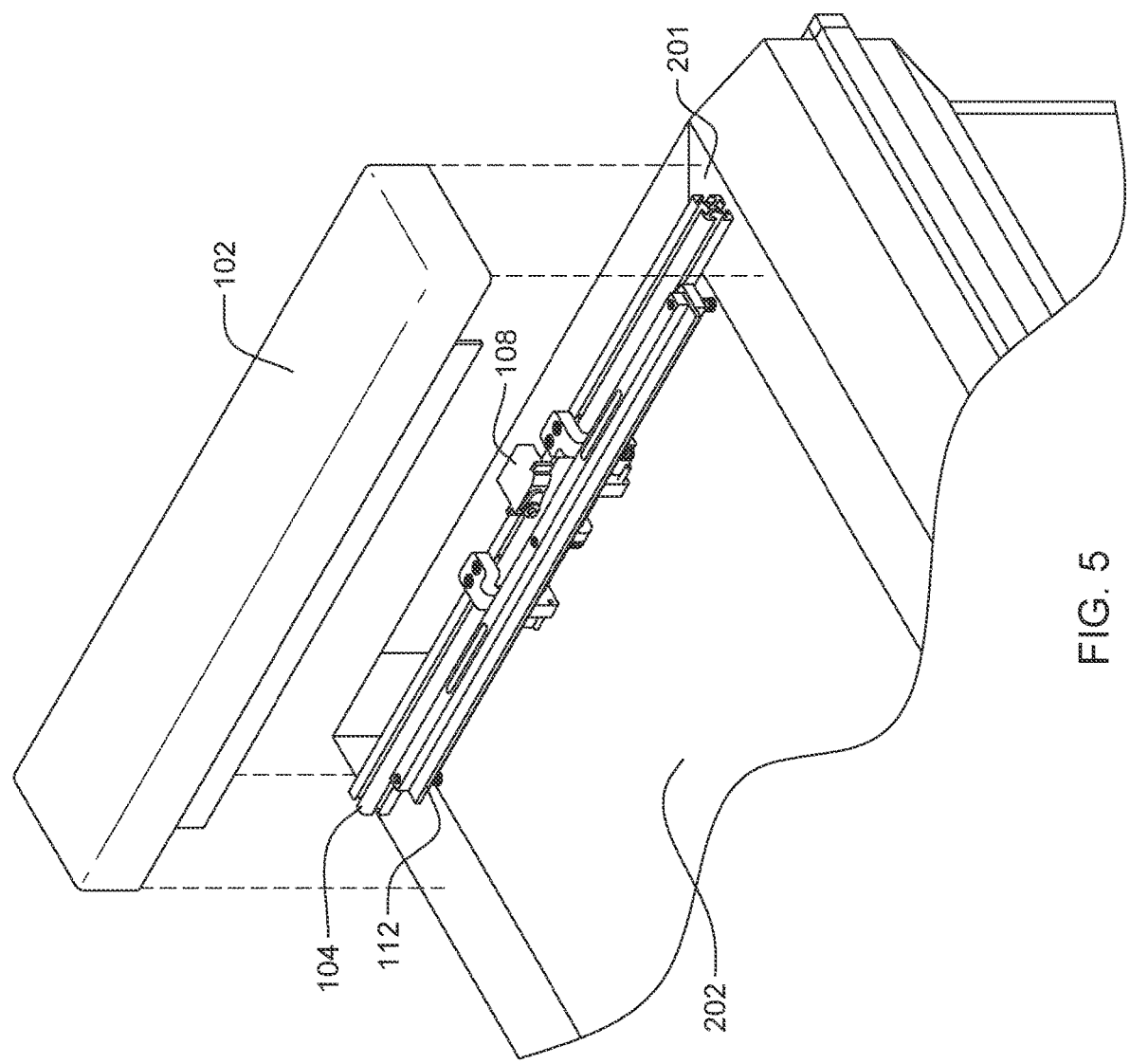
FIG. 5 depicts an exploded view of the installed conveyor belt sanitizing apparatus, in accordance with one embodiment of the present invention.

Shown in FIG. 4 is a conveyor belt 200 with the apparatus 100 installed at the far end of the conveyor belt, and enclosed within cover 102. The case 102 is designed to encapsulate the remainder of the elements of the apparatus 100 to provide protection to these elements and create an enclosed space for the elements to operate. The case 102 may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like. The shape of the case 102 is based on the conveyor belt design. The location of the apparatus 100 at the far end of the conveyor belt means that, when in use, that any surface which is exposed to the customer has been cleaned and/or sterilized. Shown in FIG. 5 is the apparatus 100 installed with the case 102 removed, showing the frame 104 attached to the conveyor belt frame 201 and positioned over the conveyor belt 202. In this embodiment, the pump 108 is within the case 102, but can be positioned in the solution container 106 which would be positioned near the operator at the other end of the conveyor belt 202.

In use, the applicator 112 is in contact with the conveyor belt and is spreading the solution across the conveyor belt. Where the applicator 112 is made of a porous material, the applicator 112 absorbs the solution 130 and due to the pressure of the applicator 112 on the conveyor belt, the solution 130 is applied to the conveyor belt. Where the applicator 112 is made from a non-porous material, the applicator 112 is spreading the solution 130 evenly across the entire surface of the conveyor belt. The quantity of the solution 130 which is applied on to the applicator 112. In some embodiments, removes excess solution 130 on the conveyor belt.

The method of operation of the present invention may take on many forms based on the conveyor belt operation and the preferred application of the conveyor belt sanitizing apparatus 100 may operate in a manual or automatic style modes. In some embodiments, a computing device is integrated into the system, where the computing device is able to receive a command to active the system, in which the applicator is moved from a "resting" position to an "active" position and the pump 108 is activated. The applicator 112 is pressed against the conveyor belt and the pump 108 and tubing 110 applies the solution 130, The system may be preprogramed based on the conveyor belt design and the device assembly. The system may be activated manually by the cashier through the pressing of a button or multiple buttons which control individual functions, which repositions the applicator 112 and initiates the pump 108. The timing of the repositioning of the applicator 112 and the initiation of the pump(s) 108 is predetermined based on the speed of the applicator 112 repositioning, the applicator 112 material, and the speed of the conveyor belt. The device may have an internal battery or may be integrated into an external power source, such as the conveyor belt. Based on the type of solution and the solution's efficiencies (e.g., dwell time), which is being used to clean the conveyor belt, the time/frequency when the system is in use may differ. For example, some solutions may only require this been done once an hour and when customers are not putting their items on the conveyor belt, so the system would be in use during "down time." In other embodiments, the solution may be a fast-drying solution and can be run at higher frequency or even when customers are placing items on the conveyor belt.

In some embodiments, once the button is pushed, this initiates the entire operation of the dispenser. The pump 108 is set to run for any given specified amount of time to ensure that the applicator 112 is saturated enough to apply the sanitizing solution. After pump 108 runs for its specified time, the applicator 112 then automatically pivots to make contact with the conveyor belt. The applicator 112 continues to run for any given specified amount of time maintaining contact with the conveyor belt while applying the solution 130. The specified amount of time that the applicator 112 makes contact with the conveyor belt is set to ensure that the solution 130 fully covers and adheres to the conveyor belt as the conveyor belt is running. The applicator 112 then withdraws from making contact and returns to its resting position. The entire operation from start to completion is typically a few minutes or less to completely cover the entirety of the conveyor belt. This depends on the conveyor belt length and speed. The solution 130 evaporates in a short period of time leaving the conveyor belt cleaned, sanitized, and dry.

While the process discussed in conjunction with the method is fully capable of achieving the objects of the present invention, the order of the process is not intended to be limiting as to the available sequence of events or activities. Rather, the method is merely exemplary of the process of a preferred embodiment, and no limitations are intended.

While the particular conveyor belt cleaning apparatus of the present invention as herein shown and disclosed in detail is fully capable of obtaining the objects and providing the advantages herein before stated, it is to be understood that it is merely illustrative of the presently preferred embodiments of the invention and that no limitations are intended to the details of use, construction or design herein shown other than as described in the appended claims.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A conveyor belt cleaning apparatus, comprising:
a case, wherein the case is designed to secure to a conveyor belt assembly;
a frame member, wherein the frame member is secured to the case;
a positioning system attached to the frame member;
at least one applicator attached to the positioning system;
tubing attached to the frame member and positioned distal to the applicator and wherein the tubing applies a solution directly onto the at least one applicator;
at least one pump connected to the tubing; and
a solution reservoir connected to the at least one pump;
wherein the positioning system is able to rotate the applicator about a pivot point.

2. The conveyor belt cleaning apparatus of claim 1, further comprising, a tension system in communication with the at least one applicator to secure the at least one applicator to the frame member.

3. The conveyor belt cleaning apparatus of claim 1, wherein the at least one applicator is constructed from a porous material.

4. The conveyor belt cleaning apparatus of claim 1, wherein the solution reservoir, further comprises, and a solution container, wherein the solution container connected with the base.

5. The conveyor belt cleaning apparatus of claim 1, wherein the at least one applicator is removable.

6. The conveyor belt cleaning apparatus of claim 1, wherein the at least one pump and the solution reservoir are located distal to the case.

7. A conveyor belt cleaning apparatus, comprising:
a frame member secure to a conveyor belt assembly;

a solution application assembly, wherein the solution application assembly comprises a pump, tubing, and a solution reservoir;

at least one applicator attached to the frame member and in communication with the tubing positioned to apply a solution directly onto the at least one applicator; and a positioning system attaching the at least one applicator to the frame and wherein the positioning system is able to rotate the applicator about a pivot point.

8. The conveyor belt cleaning apparatus of claim 7, wherein the at least one applicator is made from a porous material.

9. The conveyor belt cleaning apparatus of claim 7, wherein the positioning system attached the at least one applicator to the frame and repositions the at least one applicator about one axis of movement.

10. The conveyor belt cleaning apparatus of claim 7, wherein the tubing directly injects a solution into the at least one applicators.

11. The conveyor belt cleaning apparatus of claim 7, wherein the tubing interfaces with the at least one applicator at two or more locations.

12. A conveyor belt cleaning apparatus, comprising:
a solution reservoir;
a pump connected to the solution reservoir;
tubing connected to the pump;
a frame in communication with the conveyor belt;
a positioning system mechanically connected to the frame;
an applicator mount attached to the positioning system, wherein the positioning system is able to rotate the applicator about a pivot point;
an applicator attached to applicator mount and wherein the applicator is in communication with the tubing, and wherein a solution is applied directly to the applicator.

13. The conveyor belt cleaning apparatus of claim 12, further comprising a case, wherein the case encapsulates the frame member, pump, tubing, and applicator.

14. The conveyor belt cleaning apparatus of claim 13, wherein the solution reservoir is located distal to the case.

15. The conveyor belt cleaning apparatus of claim 12, wherein the solution reservoir has a replaceable solution container.

16. The conveyor belt cleaning apparatus of claim 12, further comprising a motor attached to the applicator, wherein the motor is in electrical connection with the positioning system.

* * * * *